(12) United States Patent
Staser et al.

(10) Patent No.: US 11,479,091 B2
(45) Date of Patent: Oct. 25, 2022

(54) VEHICLE DOOR MODULE

(71) Applicant: Inteva Products, LLC, Troy, MI (US)

(72) Inventors: Brian H. Staser, Oxford, MI (US);
Ashley Simpson, Royal Oak, MI (US);
Lisa Hopman, Oxford, MI (US);
Thomas Charles Sybrandy,
Washington, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 166 days.

(21) Appl. No.: 16/760,165

(22) PCT Filed: Nov. 9, 2018

(86) PCT No.: PCT/US2018/059948
§ 371 (c)(1),
(2) Date: Apr. 29, 2020

(87) PCT Pub. No.: WO2019/094673
PCT Pub. Date: May 16, 2019

(65) Prior Publication Data
US 2020/0338968 A1 Oct. 29, 2020

Related U.S. Application Data

(60) Provisional application No. 62/584,333, filed on Nov. 10, 2017.

(51) Int. Cl.
*B60J 5/04* (2006.01)
(52) U.S. Cl.
CPC .......... *B60J 5/0452* (2013.01); *B60J 5/0416* (2013.01); *B60J 5/0418* (2013.01); *B60J 5/0484* (2013.01); *E05Y 2900/531* (2013.01)

(58) Field of Classification Search
CPC ...... B60J 5/0452; B60J 5/0416; B60J 5/0418; B60J 5/0484; B29C 39/10; B29D 12/00
(Continued)

(56) References Cited

U.S. PATENT DOCUMENTS

| 3,964,208 | A | * | 6/1976 | Renner | ................. B60J 5/0412 49/502 |
| 5,094,034 | A | * | 3/1992 | Freeman | ................. B60J 5/0437 296/146.6 |

(Continued)

FOREIGN PATENT DOCUMENTS

| DE | 19915151 A1 | 9/2000 |
| DE | 19937000 A1 | 2/2001 |

(Continued)

OTHER PUBLICATIONS

International Search Report for International Application No. PCT/US2018/059948, Application Filing Date Nov. 9, 2018, dated Mar. 21, 2019, 4 pages.

(Continued)

*Primary Examiner* — Joseph D. Pape
(74) *Attorney, Agent, or Firm* — Cantor Colburn LLP

(57) ABSTRACT

A vehicle door module includes a unitary frame and areas circumscribed by the unitary frame wherein the circumscribed areas are filled with a material comprising a closed cell polymeric foam. The vehicle door module can be made by overmolding or compression molding.

19 Claims, 3 Drawing Sheets

(58) Field of Classification Search
USPC .......................................... 296/146.5, 146.6
See application file for complete search history.

(56) References Cited

U.S. PATENT DOCUMENTS

| | | | |
|---|---|---|---|
| 5,124,186 A * | 6/1992 | Wycech | B60J 5/0444 |
| | | | 264/46.6 |
| 5,535,553 A | 7/1996 | Staser et al. | |
| 5,595,415 A | 1/1997 | Beaulat | |
| 6,409,250 B1 | 6/2002 | Schultheiss | |
| 6,883,858 B2 * | 4/2005 | Barz | B62D 29/002 |
| | | | 296/187.02 |
| 7,246,465 B2 | 7/2007 | Staser | |
| 7,882,658 B2 | 2/2011 | Staser et al. | |
| 8,341,890 B2 | 1/2013 | Staser et al. | |
| 9,103,151 B2 | 8/2015 | Kriese et al. | |
| 9,233,599 B2 | 1/2016 | Kriese et al. | |
| 9,511,652 B2 | 12/2016 | Barr et al. | |
| 9,623,814 B2 * | 4/2017 | Belpaire | B62D 29/004 |
| 2004/0113455 A1 | 6/2004 | Schmidt | |
| 2006/0261635 A1 | 11/2006 | Winborn et al. | |
| 2012/0292125 A1 | 11/2012 | Kriese et al. | |
| 2016/0136870 A1 | 5/2016 | Thienel et al. | |

FOREIGN PATENT DOCUMENTS

| | | | | |
|---|---|---|---|---|
| DE | 10120099 C1 | 9/2002 | | |
| DE | 10155356 B4 | 4/2008 | | |
| DE | 202011050329 U1 | 9/2012 | | |
| EP | 1057671 B1 | 12/2004 | | |
| FR | 3022174 A1 * | 12/2015 | ....... | B29C 45/14311 |
| SU | 1661041 A1 | 2/1988 | | |
| WO | 2019094673 A1 | 5/2019 | | |

OTHER PUBLICATIONS

Written Opinion for International Application No. PCT/US2018/059948, Application Filing Date Nov. 9, 2018, dated Mar. 21, 2019, 5 pages.

* cited by examiner

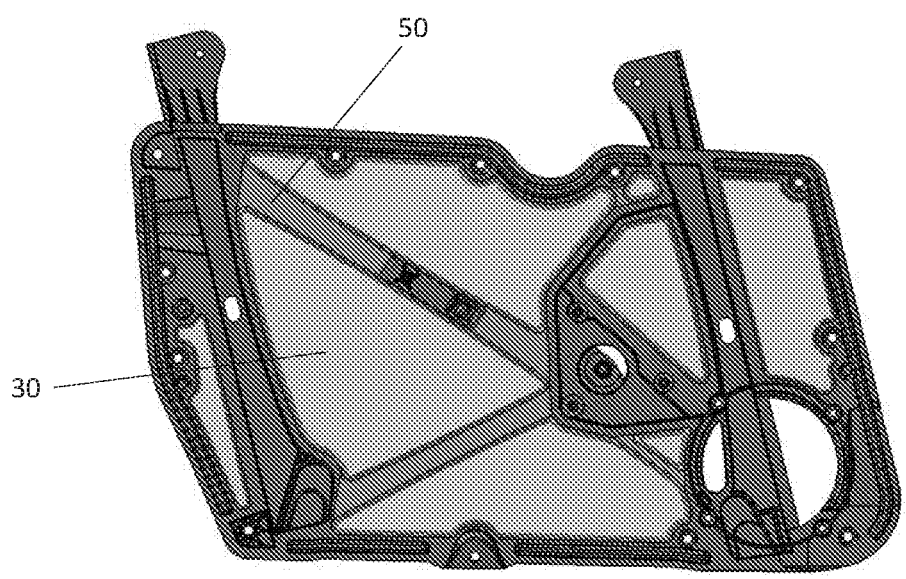

VEHICLE DOOR MODULE

CROSS REFERENCE TO RELATED APPLICATIONS

This application is a National Stage application of PCT/US2018/059948, filed Nov. 9, 2018, which claims the benefit of U.S. Provisional Application No. 62/584,333, filed Nov. 10, 2017, both of which are incorporated by reference in their entirety herein.

BACKGROUND

Vehicle door modules are part of an integrated door assembly. The vehicle door module has attachment provisions for a number of components such as a window regulator, speaker and wire harness. The vehicle door module provides sufficient structural strength to support these components and to support their function.

Previously vehicle door modules were formed from metal, plastic, or a combination thereof. As there is an increasing need and desire to reduce overall vehicle weight, there is an increasing need and desire to reduce the weight of all vehicle components while maintaining the same functionality. Accordingly, there is a need and desire for a vehicle door module with decreased weight compared to previous vehicle door modules.

BRIEF DESCRIPTION

Disclosed herein is a vehicle door module that includes a unitary frame and areas circumscribed by the unitary frame wherein the circumscribed areas are filled with a material comprising a closed cell polymeric foam. In some embodiments the circumscribed areas are filled with a material consisting essentially of a closed cell polymeric foam.

Also disclosed herein is a method of making the above described vehicle door module. The method includes overmolding a unitary frame having open circumscribed areas with a closed cell polymeric foam to fill the circumscribed open areas with the closed cell polymeric foam.

Alternately, a method of making the above described door module includes overmolding a closed cell polymeric foam with a unitary frame having circumscribed areas to produce a unitary frame having circumscribed areas filled with the polymeric closed cell foam.

It is further contemplated that a method of making the vehicle door module may include compression molding a closed cell polymeric foam with a unitary frame.

BRIEF DESCRIPTION OF THE DRAWINGS

The following descriptions should not be considered limiting in any way. With reference to the accompanying drawings, like elements are numbered alike:

FIGS. 2 and 3 depicts a unitary framed with filled circumscribed areas.

DETAILED DESCRIPTION

A detailed description of one or more embodiments of the disclosed apparatus and method are presented herein by way of exemplification and not limitation with reference to the Figures.

The vehicle door module described herein has a unitary frame that provides structural strength to the door module. The unitary frame circumscribes areas which are filled with a material comprising a closed cell polymeric foam. In some embodiments the unitary frame circumscribes areas which are filled with a material consisting essentially of a closed cell polymeric foam. "Consisting essentially of" in this context allows for the inclusion of stabilizers, colorants and similar additives but excludes unfoamed thermoplastic materials.

Figure 1:
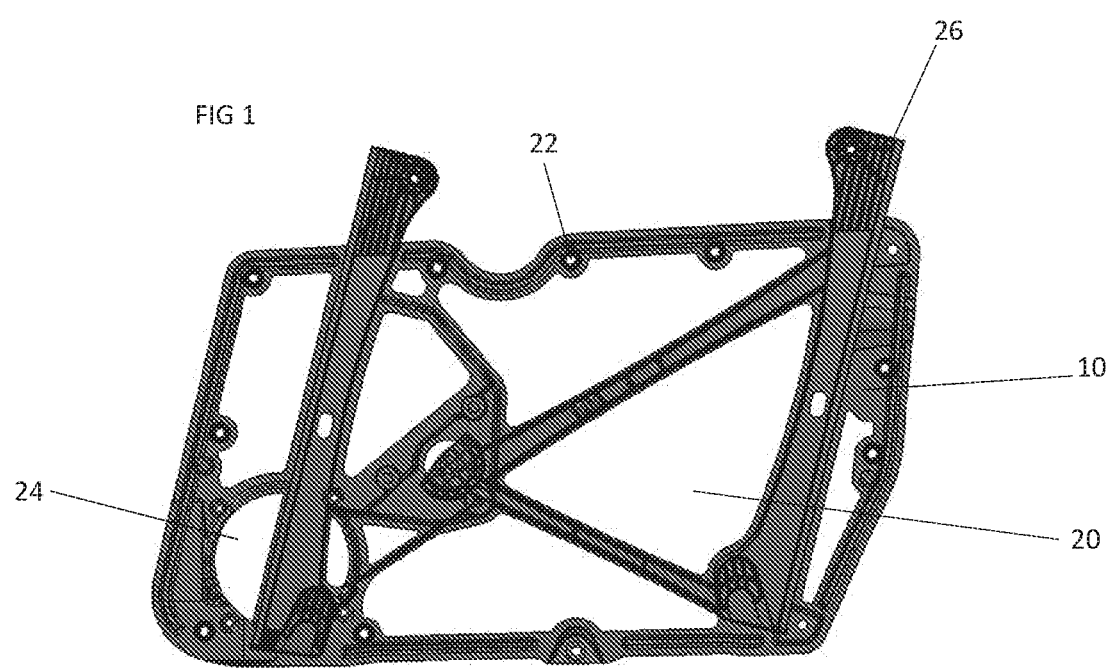
FIG. 1 depicts a unitary frame for a vehicle door module having open circumscribed areas

FIG. 1 shows the unitary frame, 10, having circumscribed areas, 20. The unitary frame also has through holes, 22, for attachment of other portions of the door assembly, and a location, 24, for an audio speaker. FIG. 1 shows a window regulator, 26, with integrated rails but it is also contemplated that any window regulator system could be used.

Figure 2:
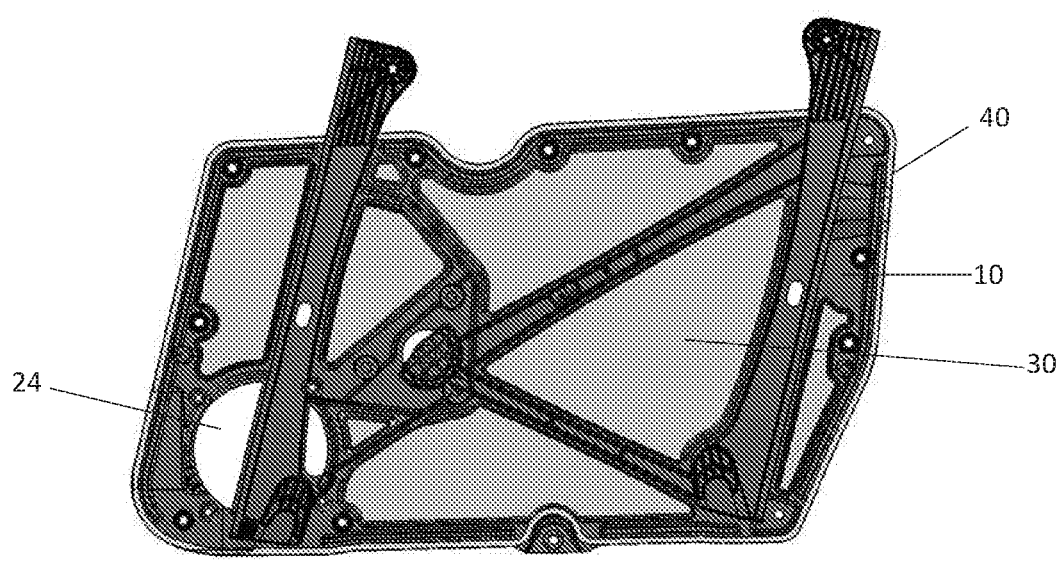

FIG. 2 shows the unitary frame, 10, having filled circumscribed areas, 30. The filled circumscribed areas, 30, consist essentially of a closed cell polymeric foam. The closed cell polymeric foam may fill the circumscribed areas evenly or may comprise a slack area or pocket to accommodate a protrusion from another portion of the door assembly. The vehicle door module may optionally comprise a perimeter seal, 40. The perimeter door seal may comprise a closed cell polymeric foam which is the same as or different from the closed cell polymeric foam used in the filled circumscribed areas. The perimeter seal cross section can be compressive or flexural in design. Different areas of polymeric foam can be linked by foam bridges 50, as shown in FIG. 3. In embodiments where the foam is overmolded, this can improve the material flow and reduce the total number of injection points. In embodiments where the foam is a thermoformed or compression molded sheet adhered to the unitary frame 10, these bridges allow for improved relative positioning of the different cell foam portions.

The unitary frame comprises an unfoamed polymeric composition. The unfoamed polymeric composition may further comprise a reinforcing filler. Exemplary unfoamed polymeric materials include thermoplastics such as polyethylene, polypropylene, polyethylene-polypropylene copolymer, polyamide, polyamide/polyphenylene ether blends, and combinations thereof. Exemplary reinforcing fillers include glass fiber, carbon fiber, carbon fibrils, wollastonite, and combinations thereof. The glass fiber and carbon fiber may be continuous and in textile form or may be discontinuous chopped fiber. When the reinforcing filler is present it may be used in an amount of 10 to 60, or, 25 to 40 weight percent, based on the total weight of the unitary frame.

The closed cell polymeric foam may be a thermoset or a thermoplastic. Exemplary thermosets include one part or two part urethane foams. Exemplary thermoplastics include thermoplastic elastomers (TPE) and silicones. The closed cell polymeric foam may have a thickness of 0.5 mil to 5 mil (0.0127 to 0.127 mm). In some embodiments, the closed cell foam in the perimeter seal has a durometer value (Shore A) of 3 to 80, as determined by ASTM D2240. Within this range it is contemplated that when the perimeter seal has a cross section that is compressive in design the perimeter seal material may have a Shore A value of 3 to 30. Also within this range, it is contemplated that when the perimeter seal has a cross section that is flexural in design the perimeter seal may have a Shore A value of 40 to 80.

The adhesion between the unitary frame and the closed cell polymeric foam may be promoted or provided through the use of an adhesive material, a compatibilizing interlayer, or a surface treatment. Exemplary surface treatments include flame treating and plasma treating. Exemplary adhesives include acrylic based adhesives. Exemplary compatibilizing interlayers include polymers known to be compatible with both the unitary frame and the closed cell polymeric foam. For example, when the unitary frame comprises polypropylene and the closed cell polymeric foam comprises polystyrene the compatibilizing interlayer may comprise a polypropylene-polystyrene copolymer. In some embodiments, the unfoamed polymeric composition and the closed cell polymeric foam are compatible and no adhesive, compatibilizing interlayer, or surface treatment is required. For example, when the unitary frame comprises polyamide and the closed cell polymeric foam comprises a urethane, no adhesive material, compatibilizing interlayer, or surface treatment is required. Similarly, when the unitary frame comprises polypropylene and the closed cell polymeric foam comprises a thermoplastic elastomer, no adhesive material, compatibilizing interlayer, or surface treatment is required.

The vehicle door module may be made by first forming the unitary frame and then overmolding the closed cell polymeric foam. The unitary frame and the subsequent overmolding can occur in the same tool or separate tools as needed. If necessary, the unitary frame may be surfaced treated or coated with an adhesive to promote adhesion.

Alternatively, the closed cell polymeric foam may be placed in the tool and the unitary frame overmolded onto the foam. The closed cell polymeric foam may be coated with or impregnated with an adhesive to promote adhesion to the unitary frame. It is also contemplated that a closed cell polymeric foam can be formed in the same tool as is used for overmolding the unitary frame.

In a third approach the closed cell polymeric foam is compression molded with the unitary frame. In this approach, the closed polymeric foam and unitary frame are placed in a tool and compression molded.

In any of the foregoing methods the molding temperatures, times and pressures will be determined by the materials employed and can be determined by a man of skill in the art.

In any of the foregoing methods, the foam used in the perimeter seal may be the same as or different from the circumscribed areas. It is also contemplated that when the closed cell polymeric foam is overmolded onto the unitary frame and the perimeter seal uses a different material from the circumscribed areas the overmolding may be done in a sequential manner. When performed in a sequential manner the two overmolding steps may occur in the same tool or separate tools.

Embodiment 1: A vehicle door module comprising a unitary frame and areas circumscribed by the unitary frame wherein the circumscribed areas are filled with a material comprising a closed cell polymeric foam.

Embodiment 2: The vehicle door module of Embodiment 1, wherein the unitary frame comprises polypropylene and glass fiber.

Embodiment 3: The vehicle door module of Embodiment 1 or 2, wherein the glass fiber is present in an amount of 25 to 40 weight percent, based on the total weight of the unitary frame.

Embodiment 4: The vehicle door module of any one of Embodiments 1 to 3, wherein the closed cell polymeric foam comprises a thermoplastic elastomer.

Embodiment 5: The vehicle door module of any one of the preceding Embodiments, wherein the closed cell polymeric foam comprises a urethane foam.

Embodiment 6: The vehicle door module of any one of the preceding Embodiments, further comprising a perimeter seal.

Embodiment 7: The vehicle door module of Embodiment 6, wherein the perimeter seal comprises the same closed cell polymeric foam as the circumscribed areas.

Embodiment 8: The vehicle door module of any of the preceding Embodiments further comprising foam bridges connecting the circumscribed areas filled with the material comprising a closed cell polymeric foam.

Embodiment 9: The vehicle door module of any of the preceding Embodiments further comprising an adhesive disposed between a portion of the unitary frame and a portion of the closed cell polymeric foam.

Embodiment 10: The vehicle door module of any of the preceding Embodiments wherein the circumscribed areas are filled with a material consisting essentially of a closed cell polymeric foam.

Embodiment 11: A method of making a vehicle door module comprising overmolding a unitary frame having open circumscribed areas with a closed cell polymeric foam to fill the circumscribed open areas with the closed cell polymeric foam.

Embodiment 12: The method of Embodiment 11, wherein the unitary frame comprises polypropylene and glass fiber and the closed cell polymer foam comprises a thermoplastic elastomer.

Embodiment 13: The method of Embodiment 11 or 12, further comprising surface treating the unitary frame prior to overmolding.

Embodiment 14: The method of any one of Embodiments 11 to 13, wherein the unitary frame is formed and overmolded in a single tool.

Embodiment 15: The method of any one of Embodiments 11 to 14, wherein the unitary frame comprises polypropylene and glass fiber.

Embodiment 16: The method of any one of Embodiment 11 to 15, wherein the polymeric closed cell foam comprises a thermoplastic elastomer.

Embodiment 17: The method of any one of Embodiments 11 to 15, wherein the closed cell polymeric foam comprises a urethane foam.

Embodiment 18: A method of making a vehicle door module comprises overmolding a closed cell polymeric foam with a unitary frame having circumscribed areas to produce a unitary frame having circumscribed areas filled with the polymeric closed cell foam.

Embodiment 19: The method of Embodiment 18, wherein the unitary frame comprises polypropylene and glass fiber and the closed cell polymeric foam comprises a thermoplastic elastomer.

Embodiment 20: The method of Embodiment 18 or 19, wherein the closed cell polymeric foam is formed and overmolded in a single tool.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle door module comprising a unitary frame and areas circumscribed by the unitary frame wherein the circumscribed areas are filled with a material comprising a closed cell polymeric foam; and further comprising a perimeter seal.

2. The vehicle door module of claim 1, wherein the unitary frame comprises polypropylene and glass fiber.

3. The vehicle door module of claim 1, wherein the glass fiber is present in an amount of 25 to 40 weight percent, based on the total weight of the unitary frame.

4. The vehicle door module of claim 1, wherein the closed cell polymeric foam comprises a thermoplastic elastomer.

5. The vehicle door module of claim 1, wherein the closed cell polymeric foam comprises a urethane foam.

6. The vehicle door module of claim 1, wherein the perimeter seal comprises the same closed cell polymeric foam as the circumscribed areas.

7. The vehicle door module of claim 1, further comprising foam bridges connecting the circumscribed areas filled with the material comprising a closed cell polymeric foam.

8. The vehicle door module of claim 1, further comprising an adhesive disposed between a portion of the unitary frame and a portion of the closed cell polymeric foam.

9. The vehicle door module of claim 1, wherein the circumscribed areas are filled with a material consisting essentially of a closed cell polymeric foam.

10. A method of making a vehicle door module comprising overmolding a unitary frame having open circumscribed areas with a closed cell polymeric foam to fill the circumscribed open areas with the closed cell polymeric foam; and providing a perimeter seal.

11. The method of claim 10, wherein the unitary frame comprises polypropylene and glass fiber and the closed cell polymer foam comprises a thermoplastic elastomer.

12. The method of claim 10, further comprising surface treating the unitary frame prior to overmolding.

13. The method of claim 10, wherein the unitary frame is formed and overmolded in a single tool.

14. The method of claim 10, wherein the unitary frame comprises polypropylene and glass fiber.

15. The method of claim 10, wherein the polymeric closed cell foam comprises a thermoplastic elastomer.

16. The method of claim 10, wherein the closed cell polymeric foam comprises a urethane foam.

17. A method of making a vehicle door module comprises overmolding a closed cell polymeric foam with a unitary frame having circumscribed areas to produce a unitary frame having circumscribed areas filled with the polymeric closed cell foam; and providing a perimeter seal.

18. The method of claim 17, wherein the unitary frame comprises polypropylene and glass fiber and the closed cell polymeric foam comprises a thermoplastic elastomer.

19. The method of claim 17, wherein the closed cell polymeric foam is formed and overmolded in a single tool.

* * * * *